(12) United States Patent
Doerner

(10) Patent No.: US 7,797,229 B2
(45) Date of Patent: Sep. 14, 2010

(54) CREDIT AUTHORIZATION SYSTEMS AND METHODS

(75) Inventor: Robert Doerner, Offenbach (DE)

(73) Assignee: SAP AG, Walldorf (DE)

( * ) Notice: Subject to any disclaimer, the term of this patent is extended or adjusted under 35 U.S.C. 154(b) by 1207 days.

(21) Appl. No.: 10/830,299

(22) Filed: Apr. 23, 2004

(65) Prior Publication Data

US 2004/0260644 A1 Dec. 23, 2004

(30) Foreign Application Priority Data

Apr. 23, 2003 (EP) ................................ 03009222

(51) Int. Cl.
*G06F 17/60* (2006.01)
(52) U.S. Cl. .......................................... 705/38; 705/35
(58) Field of Classification Search ............... 705/1–50; 235/379–380; 1/1; 713/193; 902/5
See application file for complete search history.

(56) References Cited

U.S. PATENT DOCUMENTS

| | | | | |
|---|---|---|---|---|
| 6,038,552 | A | 3/2000 | Fleischl et al. ................. | 705/44 |
| 6,377,935 | B1 | 4/2002 | Deaton et al. .................. | 705/14 |
| 2002/0095373 | A1* | 7/2002 | Melchior et al. ............... | 705/39 |
| 2002/0128921 | A1 | 9/2002 | Tarr ............................. | 705/26 |
| 2002/0161724 | A1 | 10/2002 | Peters .......................... | 705/72 |
| 2003/0055726 | A1* | 3/2003 | Sohya et al. ................... | 705/14 |
| 2003/0110123 | A1* | 6/2003 | Sugano et al. ................. | 705/38 |
| 2007/0239566 | A1* | 10/2007 | Dunnahoo et al. ............. | 705/27 |

FOREIGN PATENT DOCUMENTS

| | | |
|---|---|---|
| EP | 0 779 587 A2 | 6/1997 |
| WO | WO 99/27478 | 6/1999 |

OTHER PUBLICATIONS

Francis Garrit, Credit Approval & Limits Managment Survey, Mar. 2008, RMA Journal, journal web, 1-3.*

* cited by examiner

*Primary Examiner*—James P Trammell
*Assistant Examiner*—Marissa Liu
(74) *Attorney, Agent, or Firm*—Finnegan, Henderson, Farabow, Garrett & Dunner, LLP

(57) ABSTRACT

Systems and methods for credit authorization are provided. In accordance with one embodiment, a method is provided for authorizing a credit request of customers of at least a first online shop and a second online shop. The method includes receiving a credit request from at least one of the first online shop and the second online shop, wherein the credit request is indicative of a requested credit amount by one of the customers. The method further includes accepting the credit request if the global payment obligation plus the credit amount does not surpass the global credit limits.

22 Claims, 5 Drawing Sheets

| 10010 | MEIER | HAUPTSSTR. 1 | BERLIN | 01.01.1970 | 23456,... |
|---|---|---|---|---|---|
| 10020 | MÜLLER | BAHNHOFSTR. 22 | MÜNCHEN | 10.10.1950 | 55566,... |
| ... | | | | | |

200

| 10010 | · | 1000 € |
|---|---|---|
| 10010 | ONLINE-SHOP A | 500 € |
| 10010 | ONLINE-SHOP B | 200 € |
| 10010 | ONLINE-SHOP C | 300 € |
| 10020 | · | 1500 € |
| ... | | |

202

| 10010 | · | 500 € |
|---|---|---|
| 10010 | ONLINE-SHOP A | 200 € |
| 10010 | ONLINE-SHOP B | 100 € |
| 10010 | ONLINE-SHOP C | 200 € |
| 10020 | · | 750 € |
| ... | | |

CREDIT AUTHORIZATION SYSTEMS AND METHODS

FIELD OF THE INVENTION

The present invention relates generally to credit transaction systems and methods and, more particularly without limitation, to credit authorization systems and methods.

BACKGROUND OF THE INVENTION

The use of transaction cards (including debit or ATM cards) for payment of merchandise is ever increasing. When purchasing merchandise using a standard transaction (i.e., credit) card, the purchaser will typically provide the merchant with the card bearing the account number (or the card number and expiration date if the purchase is being made over a telephone or computer network), and the merchant will then seek authorization from the issuer of the credit card to verify that payment will be forthcoming.

The request for authorization is conventionally made over high-speed telecommunication links using modern computer data processors. Thus, the merchant will normally receive an authorization response in "real-time." Credit cards and, particularly, credit card account numbers are somewhat standardized, thus allowing a merchant to accept credit cards from a number of credit card companies, such as companies providing credit card services under the marks VISA®, MASTERCARD® and DISCOVER®, and others, while being connected to a single credit authorization system. The account number of such cards contains information that identifies the sponsor and the particular issuer of the card, such as a local or national bank. This information is necessary to route any authorization request to the appropriate card-issuer using the credit authorization system.

One standard computer network for transmitting authorization requests is the VISA® credit transaction network. In addition to VISA® credit cards, merchants connected to this network may seek authorization for approval of transactions involving other credit cards, such as MASTERCARD® and DISCOVER® credit cards. The VISA® credit transaction network includes a plurality of data processors and financial institutions, all interconnected through telecommunication links which, based on a six digit bank identification number (BIN), route all authorization requests to the appropriate card-issuer and all authorization responses back to the requesting merchant.

In the case of online shopping, some customers do not accept providing payment by means of a credit card as this requires disclosure of the credit card number. Hence, some customers prefer other payment methods such as by check, bank or wire transfer or others. In this instance, no credit verification is available for the online shop and no protection against bad checking schemes and the like.

U.S. Pat. No. 6,377,935 shows a system which enables a store to adopt a risk management approach to credit verification based on a customers transactional history with the store. This includes frequency and dollar volume over specified intervals. A disadvantage of this system is that no such transactional history and thus no credit verification is available for a new customer and that a customer's payment history with respect to other stores cannot be taken in consideration.

U.S. patent application Ser. No. 2002/0095373A1 shows a credit monitoring system. This system enables to monitor a buyer's cumulative credit exposure by adding all invoices indicating payment obligations for which payment, or complete payment, has not yet been made, considering any payment information stored in a trade database. While this system provides monitoring of a buyers cumulative credit exposure, it does not provide credit authorization.

Therefore, a need exists for providing credit authorization systems and methods for online shops which is useable irrespective of the selected payment method.

SUMMARY OF THE INVENTION

Embodiments of the invention provide credit authorization systems and methods. In accordance with one embodiment, the present invention provides a credit authorization system for a group of online shops which is not dependent on a particular payment method. The credit authorization system may store a global payment obligation for each one of the customers of the group of online shops, i.e., the cumulative credit exposure each customer has with respect to the group of online shops.

Further, the credit authorization system may store a global credit limit for each one of the customers of the group of online shops, i.e., the maximum cumulative credit which is authorized by the group of online shops for a given customer. When one of the customers makes a credit request, e.g., for purchasing an item on one of the online shops, the corresponding online shop may forward the credit request with the purchase amount to the credit authorization system.

In response to the credit request, the credit authorization system may read the global credit limit and the global payment obligation of that customer. If the global payment obligation plus the payment amount of the online purchase does not surpass the global credit limit, the credit authorization system may authorize the credit request. A corresponding authorization message may be sent from the authorization system to the online shop and the global payment obligation of the customer is increased by the purchase amount.

Such a credit authorization system may reduce the credit risk of each one of the online shops of the group. Further, the credit authorization system may act as a central hub and, thus, prevent investments of each individual online shop for a dedicated insular credit authorization system.

In accordance with a preferred embodiment of the invention, shop-specific credit limits and shop-specific payment obligations may be stored in the credit authorization system, in addition to the global credit limits and global payment obligations at least for some of the online shops which require this granularity. For example, the total of the shop-specific credit limits of a particular customer may be less or equal to the global credit limit of that customer; alternatively the total of the shop-specific credit limits can surpass the global credit limit, e.g., when at least one of the shops is willing to accept a shop-specific credit limit which is equal to the global credit limit. Likewise the total of the shop-specific payment obligations of a particular customer may be less or equal to the global payment obligation of that customer.

For example all online shops of the group of online shops running the credit authorization system may have the same shop-specific credit limit. Alternatively the online shops can have different policies regarding the credit limits given to different classes of customers. When a new customer is registered these shop-specific credit limits can be set based on a customers credit rating.

When a credit request has been authorized, the corresponding global payment obligation and shop-specific payment obligation, if available, may be increased by the purchase amount. When an online shop receives a payment from one of its customers this may be notified from the online shop to the credit authorization system. In response the global payment obligation and the corresponding shop-specific payment obligation, if available, of that customer may be decreased by the payment amount received by the online shop.

In accordance with a further preferred embodiment of the invention, the global credit limit and/or the shop-specific credit limits may be updated periodically based on a customer's payment history and/or change of a customers credit rating. For example, updating of the credit limits may be performed according to rules which are stored in the credit authorization system.

BRIEF DESCRIPTION OF THE DRAWINGS

In the following preferred embodiments of the invention will be described in greater detail by making reference to the drawings in which:

FIG. 2 shows various exemplary database tables for storing of customer credit information in the credit authorization system, consistent with an embodiment of the invention;

DESCRIPTION OF THE EMBODIMENTS

Figure 1:
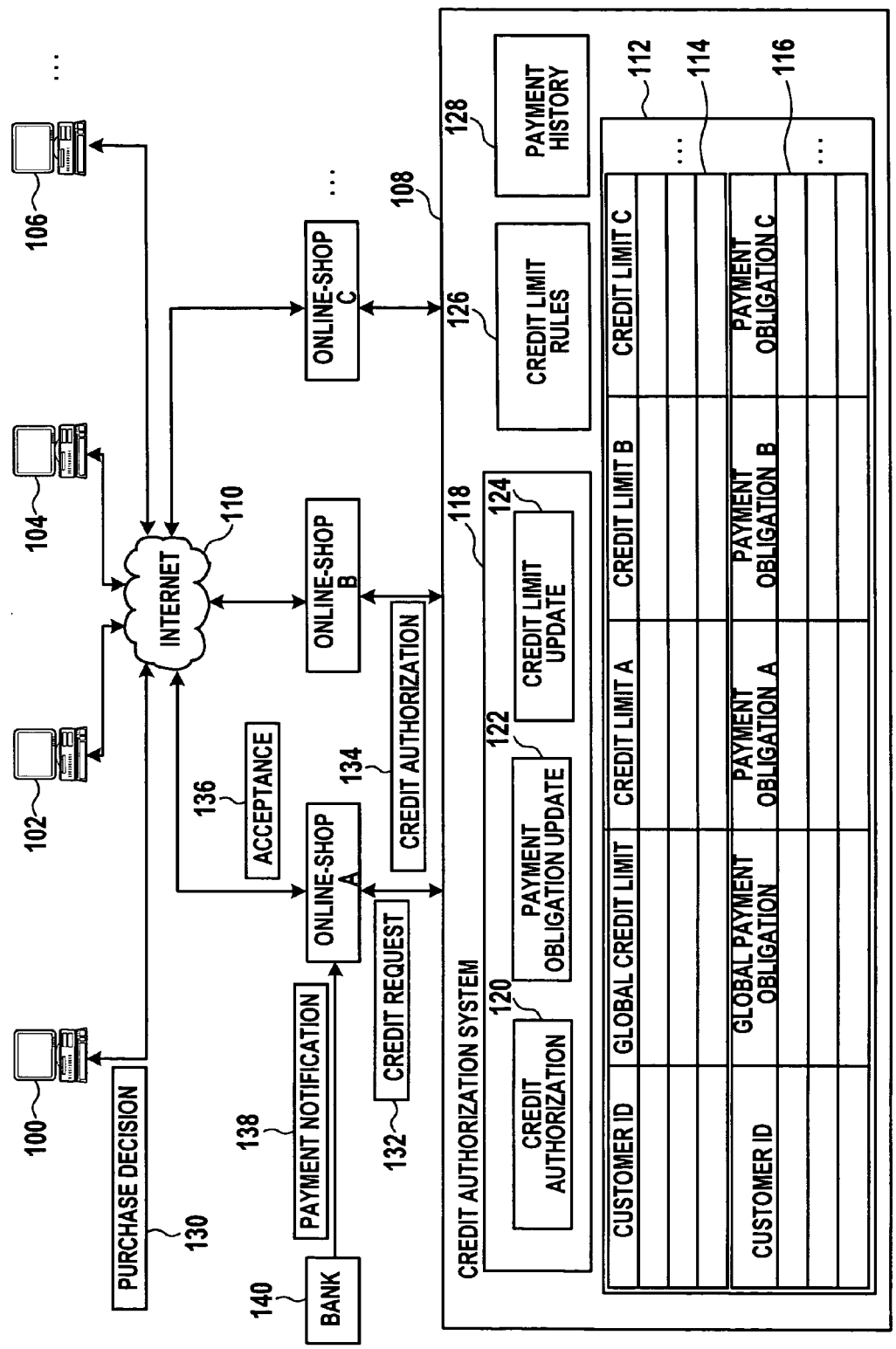
FIG. 1 is a block diagram of an exemplary computer system comprising a number of online shops and a credit authorization system, consistent with an embodiment of the invention.

FIG. 1 shows an exemplary e-commerce computer system comprising an exemplary credit authorization system 108 for multiple online-shops A, B, C, . . . . The online-shops A, B, C, . . . which belong to the computer system have a number of registered customers which use client computers 100, 102 104, 106, . . . for online shopping on the online-shops A, B, C, . . . . For example, if one of the customers wants to purchase an item or service from online-shop A, the customer starts a browser program of its client computer, e.g., client computer 100, and enters the URL of online-shop A. For access to online-shop A over Internet 110, the customer may need to enter its customer ID and password. For convenience of explanation it is assumed in the following that the customer ID of a customer is unequivocal with respect to all registered customers of the online-shops A, B, C, . . . participating in the e-commerce computer system.

The online-shops A, B, C, . . . are coupled to credit authorization system 108 which may be implemented on a server computer. Preferably, Internet 110 is also used as a communication medium between the online-shops A, B, C, . . . and credit authorization system 108.

Credit authorization system 108 may have database 112 for storage of credit limits and payment obligations for each one of the registered customers. For this purpose database 112 may have table 114 for storing of a global credit limit for each registered customer using the customer ID as a key. The global credit limit of a customer specifies the maximum amount of cumulative credits which can be provided by the participating online-shops A, B, C, . . . to that customer. In addition table 114 can comprise entries for the shop-specific credit limits of the customer.

For example, the credit limit of a given customer for purchasing from online-shop A is 'credit limit A' while online-shop B provides the same or another maximum credit which is 'credit limit B', etc.

Further, database 112 may have table 116 for storage of the customer's global payment obligations. The global payment obligation of a customer may be the cumulative credit exposure of the customer i.e., the total of the unpaid invoices of the online-shops A, B, C, . . . . Further, table 116 can contain entries for the total amount of the unpaid invoices a customer has with respect to individual ones of the online-shops which participate in the system. For example, 'payment obligation A' may be an entry which indicates the total payment obligation of a customer to online-shop A. Likewise, 'payment obligation B' may indicate the total of the customers payment obligation to online-shop B, etc. Again the customer ID may be used as a key in order to access the payment obligation data of a registered customer.

Further, credit authorization system 108 may have computer program 118 which may have a credit authorization module 120, a payment obligation update module 122, and a credit limit update module 124.

Credit authorization module 120 may be used for processing of credit requests and for determining whether a customer's credit request is accepted or declined in view of the customer's credit limit and payment obligation data stored in database 112. Payment obligation update module 122 may update the global payment obligation of a customer when a credit request is accepted by the additional credit amount. Likewise payment obligation update module 122 may update the global payment obligation of a customer when a payment notification is received which indicates that the customer has provided a certain payment amount. This payment amount may then be subtracted from this customer's global payment obligation in database table 116. If a shop-specific payment obligation is available in table 116 for the online-shop reporting the payment the respective shop-specific payment obligation may also be updated by subtracting the reported payment amount. Likewise, when a credit request which has been forwarded from that online-shop has been accepted the shop-specific payment obligation of this shop may be updated by adding the credit amount.

Credit limit update module 124 may serve to adapt the global credit limit and/or the shop-specific credit limit of the customers. For example, credit limit update module 124 may be started periodically after certain time intervals, e.g., once per month or once per quarter, for each one of the customers. Credit limit rules may be stored in storage area 126 and payment history data of the customers may be stored in storage area 128.

For example, a credit limit update for a given customer may be determined by credit limit update module 124 by reading of payment history data for that customer from storage area 128 and evaluating the payment history data by means of the credit limit rules stored in storage area 126. If credit limit update module 124 determines that a given customer has always provided payment on time the global credit limit and/or one or more of the shop-specific credit limits for that customer may be increased in accordance with the rules stored in storage area 126 and the credit limit values stored in table 114. On the other hand, if credit limit update module 124 finds that a given customer frequently pays with delay, the global credit limit and/or one or more of the shop-specific credit limits of that customer can be reduced and the new values are stored in table 114.

In operation, a registered customer may use one of the client computers, e.g., client computer 100 to connect to one of the online-shops, e.g., online-shop A through Internet 110 to select a product or service the customer desires to purchase. When the customer enters his or her purchase decision into client computer 100 e.g., by clicking on a corresponding button of online-shop A, such as 'buy now' this purchase decision 130 may be transmitted from client computer 100 to online-shop A. In response, online-shop A may send a credit request 132 to credit authorization system 108. Credit request 132 may contain data which specify the credit amount, i.e., the purchase amount for the product or service selected by the customer, and the customer ID.

When credit authorization system 108 receives credit request 132 from online shop A, credit authorization module 120 may be invoked. By way of a non-limiting example, credit authorization module 120 may read the global credit limit and the credit limit A, if available, from table 114 using the customer ID contained in the credit request 132 as a key. Further, credit authorization module 120 may read the global payment obligation and the payment obligation A, if available, from table 116 using the customer ID contained in credit request 132 as a key.

Next, credit authorization module 120 may determine whether the customer's global payment obligation plus the credit amount surpasses that customer's global credit limit. If this is the case, the credit request may be declined by credit authorization module 120. In the opposite case credit authorization module 120 may determine whether payment obligation A plus the credit amount surpassed credit limit, A, of that customer. If the payment obligation A plus the credit amount does surpass the credit limit A, the credit request 132 may be declined. This additional test may only be made for such online-shops which require shop-specific credit limits and the tracking of shop-specific payment obligations.

A credit authorization message 134 may be generated by credit authorization module 120 when both the global payment obligation plus the credit amount and the payment obligation A plus the credit amount do not surpass the global credit limit and the credit limit A, respectively. Credit authorization message 134 may be sent back to the online-shop which has sent the credit request 132, i.e., online-shop A. In response to credit authorization message 134, online-shop A may send an acceptance message 136 back to client computer 100 in order to accept the customer's purchase decision. Further, credit authorization module 120 may invoke payment obligation update module 122, which may increment the customer's global payment obligation and payment obligation A by the credit amount of credit request 132.

The customer can provide payment to online-shop A by various payment methods which are authorized by online-shop A, such as by bank transfer, wire transfer, check or credit card. When the customer has provided a payment amount, online-shop may receive a payment notification 138 from its bank 140. Payment notification 138 may indicate the payment amount and the customer ID. In response, online-shop A may generate a message indicating the payment amount and the customer ID and send the message to credit authorization system 108. Receipt of this message by credit authorization system 108 may invoke payment obligation update module 122, which may decrement this customer's global payment obligation and payment obligation A, if available, in table 116 using the customer ID as a key. The payment information may also be entered into storage area 128 in order to track the customer's payment history.

While the above has been explained primarily with respect to client computer 100 and online-shop A, it is to be understood that the same or a similar process may be carried out when another client computer is used for online shopping in another one of the online-shops participating in the system. This has the advantage that a customer's financial situation becomes transparent to the online-shops participating in the system such that the overall credit risk is reduced. Further, this provides a protection of the online-shops against fraudulent behavior of customers and facilitates usage of payment methods other than credit cards.

FIG. 2 is illustrative of an alternative embodiment. In the embodiment of FIG. 2 a customer is not necessarily identified by its unequivocal customer ID but by means of a shop-specific ID and/or by personal data such as name, address and/or birthday. In this instance the database of the credit authorization system (e.g., database 112 and credit authorization system 108 of FIG. 1) may comprise table 200 with the data fields 'name', 'street', 'city', 'birthdate', 'shop-specific user ID A', 'shop-specific user ID blank B', . . . . The first column in table 200 may be a key field with the unequivocal customer ID.

Further the database may have table 202 which may correspond to table 114 in the embodiment of FIG. 1. Each record in table 202 may indicate a credit limit for a customer having the unequivocal customer ID which is indicated in the left most column of table 202. For example, the record '10010, -, €1000', indicates that the customer with the unequivocal customer ID 10010 has a global credit limit of €1000. The record '10010, online-shop A, €500' indicates that the same customer has a shop-specific credit limit of €500 at online-shop A, etc. In other words, when a record of table 202 does not contain an indication of an online-shop the Euro amount indicated in the record may be a global credit limit. Otherwise the Euro amount may indicate a shop-specific credit limit.

Table 204 may have the same structure as table 202 but may indicate the global and shop-specific payment obligations of the customers rather than the credit limits. Hence table 204 may correspond to table 116 of FIG. 1.

In the embodiment of FIG. 2, a customer identification module may be required in the credit authorization system in order to determine the customer's unequivocal customer ID on the basis of customer data which are provided from the online-shop sending a credit request to the credit authorization system.

For example, the credit request may contain the name, address and birthdate of the customer. In this instance the identification module of the credit authorization system may query table 200 in order to identify a matching customer. If the online-shop includes the shop-specific customer ID in the credit request, this shop-specific customer ID can be mapped onto the unequivocal customer ID by means of table 200. By means of the unequivocal customer ID the credit limit and payment obligation information of that customer can be retrieved from tables 202 and 204, respectively.

Preferably, in one embodiment, an index may be provided for the data fields of table 200 to accelerate the search.

Figure 3:
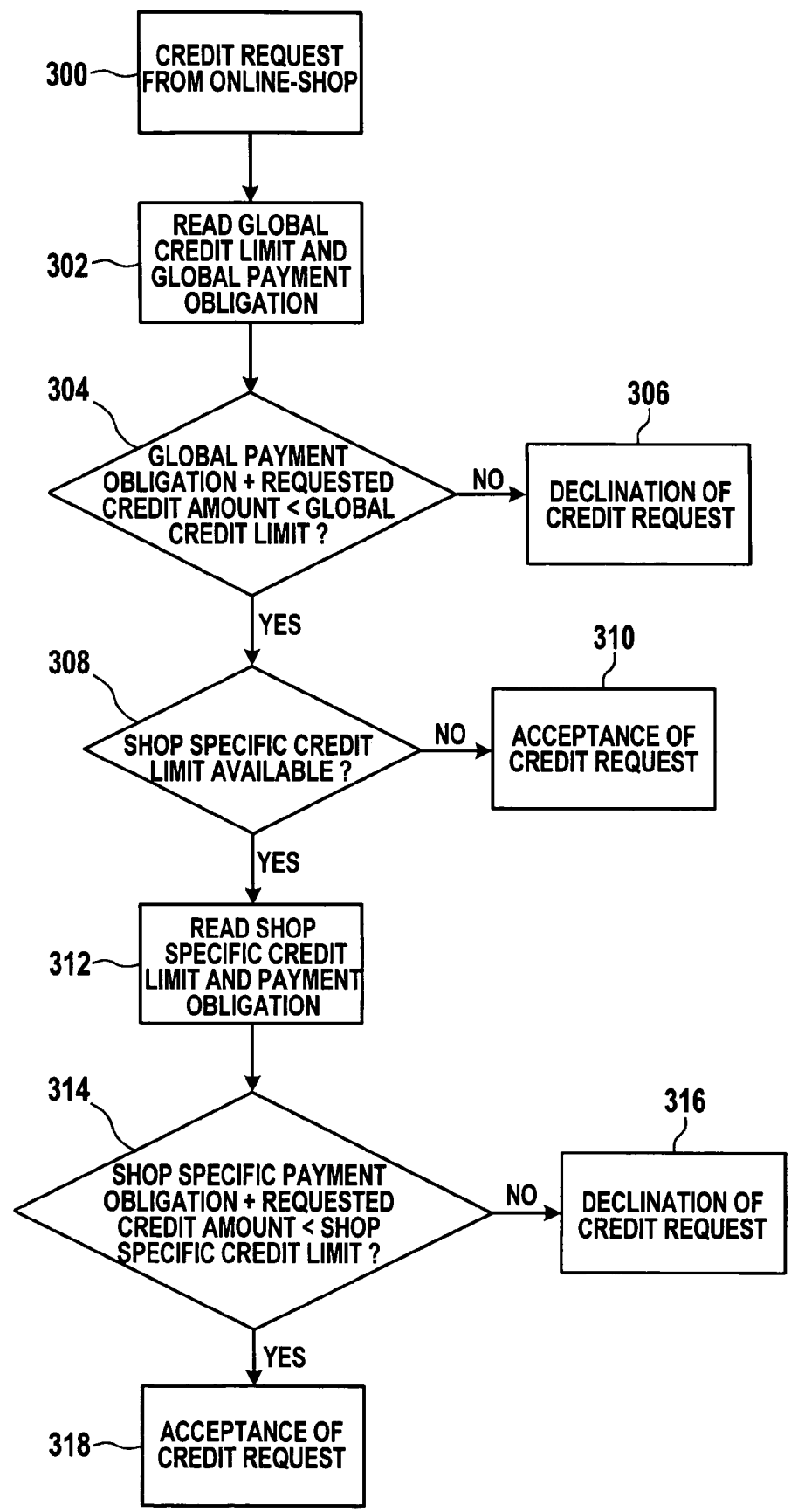
FIG. 3 is illustrative of a flow chart for an exemplary method for processing of a credit request, consistent with an embodiment of the invention.

FIG. 3 is illustrative of a flow chart for an exemplary method for processing of a credit request. In step 300, a credit request may be received by a credit authorization system from one of the online-shops participating in the system. The credit request may contain a credit amount and data identifying the customer, which has requested the credit. This can be an unequivocal customer ID or other customer data. For convenience of explanation, it is assumed in the following that the unequivocal customer ID is contained in the credit request.

In step 302, the unequivocal customer ID may be used to read the global, credit limit and global payment obligation of the customer. In one embodiment, credit authorization module 120 may read the global credit and global payment obligation from table 114. In step 304, it may be decided whether the global payment obligation plus the requested credit amount is below the global credit limit. If this is not the case the credit request may be declined in step 306. If the contrary is the case, it may be decided, in step 308, whether a shop-specific credit limit is available for the online-shop from which the credit request has been received in step 300.

If this is not the case, an acceptance of the credit request may be generated in step 310 and the acceptance may be sent to the online-shop from which the credit request had been received in step 300. If the contrary is the case, the shop-specific credit limit and the shop-specific payment obligations of the customer vis-à-vis the online-shop from which the credit request had been received in step 300 may be read in step 312.

Next, a decision may be made in step 314 whether the shop-specific payment obligation plus the requested credit amount is below the shop-specific credit limit. If this is not the case, the credit request may be declined in step 316. If the contrary is true, the credit request may be accepted in step 318 and an acceptance message is sent to the online-shop from which the credit request had been received in step 300. In one embodiment, credit authorization module 120 may perform steps 304-318.

Figure 4:
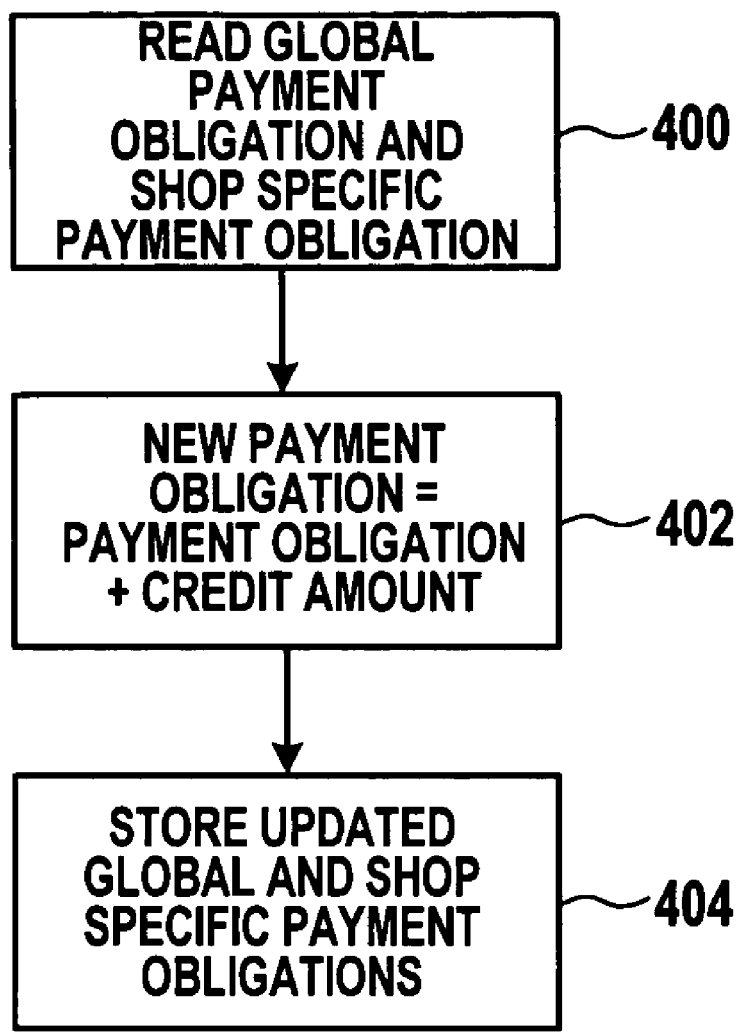
FIG. 4 is illustrative of a flow chart for an exemplary method for updating of a payment obligation after acceptance of a credit request, consistent with an embodiment of the invention.

Next, the payment obligation data for the customer may be updated in accordance with the flow chart of FIG. 4. In step 400, the global payment obligation and shop-specific payment obligation data of the customer may be read from the database by credit authorization module 120 (e.g., table 116 of FIG. 1 and table 204 of FIG. 2). In step 402, the new global payment obligation may be calculated by incrementing the global payment obligation by the credit amount; likewise the shop-specific payment obligation is updated by incrementing the shop-specific payment obligation by the credit amount. In step 404, the updated global and shop-specific payment obligations may be stored in the database. In one embodiment, steps 402 and 404 may be performed by payment obligation update module 122.

Figure 5:
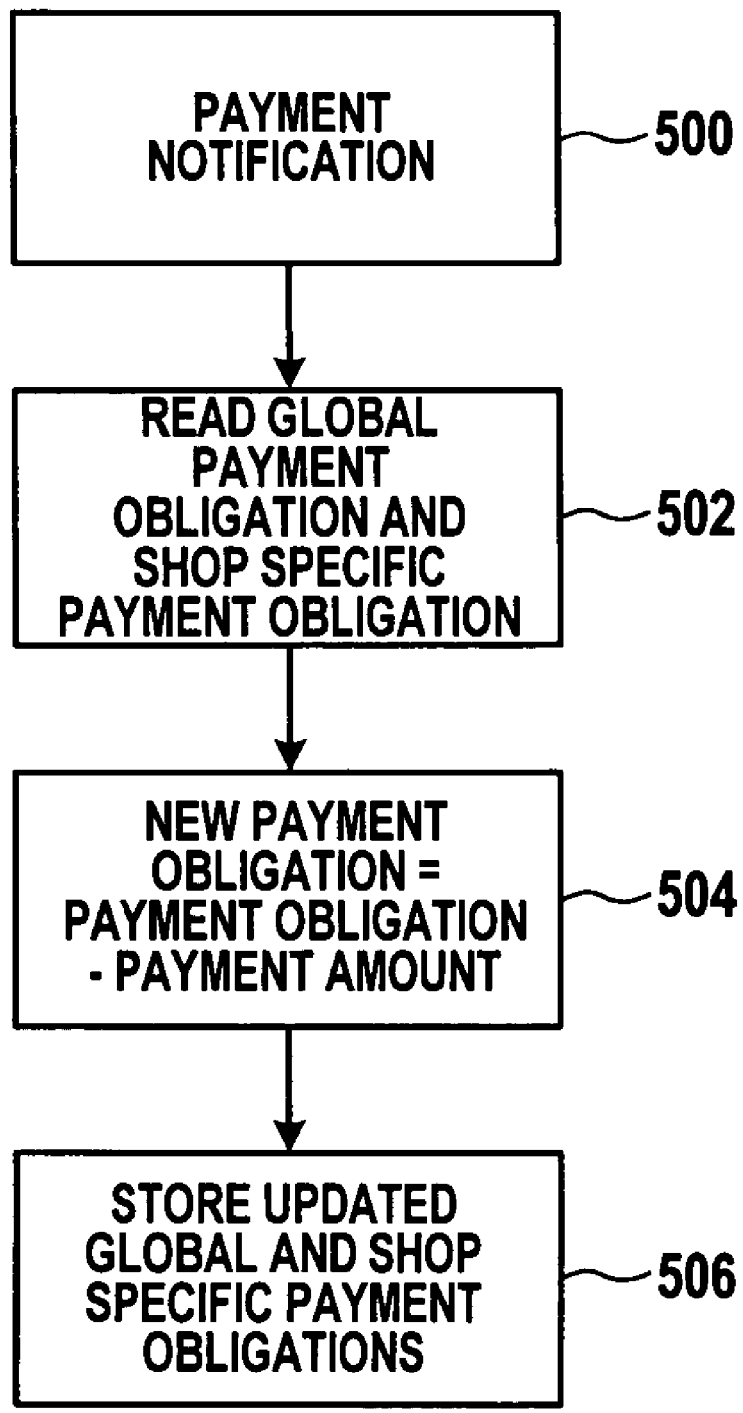
FIG. 5 is illustrative of a flow chart for an exemplary method for updating of a payment obligation after a payment amount has been provided by a customer to an online shop.

FIG. 5 is illustrative of an exemplary process for updating of the payment obligation data of a customer when payment has been provided. In step 500, a payment notification may be received by the credit authorization system from one of the online-shops. The payment notification may contain a payment amount which has been provided by one of the customers to the online-shop and the customer ID of that customer. In step 502, the global payment obligation of that customer may be read. Further the shop-specific payment obligation of that customer vis-à-vis the online-shop from which the payment notification had been received in step 500 may also be read.

In step 504, the payment obligation data may be updated by subtracting the payment amount indicated in the payment notification, i.e., the global payment obligation is decremented by the payment amount and the shop-specific payment obligation of the online-shop from which the payment notification had been received in step 500 may also be decremented by the payment amount. In step 506 the updated global and shop-specific payment obligations may be stored back into the database. In one embodiment, steps 504 and 506 may be performed by payment obligation update module 122.

One skilled in the art will appreciate that embodiments of the present disclosure may be implemented in various system or network environments to provide credit authorization systems and methods. Such environments and applications may be specially constructed for performing the various processes and operations of the disclosure or they may include a general-purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

What is claimed is:

1. A credit authorization system for authorizing a credit request of a customer, the credit authorization system comprising:
   a processor; and
   a memory storing instructions that cause the processor to perform a method comprising:
   storing a global credit limit of the customer for a plurality of online shops, wherein the global credit limit of the customer specifies a maximum amount of cumulative credit that can be provided by the plurality of online shops to the customer;
   storing a global payment obligation of the customer for the plurality of online shops, wherein the global payment obligation for the customer is defined as a cumulative credit exposure that the customer has with respect to the plurality of online shops;
   storing shop-specific credit limits for the plurality of online shops;
   storing rules for updating the global credit limit and the shop-specific credit limits for the plurality of online shops;
   receiving the credit request of the customer when the customer requests credit from one of the plurality of online shops;
   determining if the credit request can be accepted in view of the shop-specific credit limit, shop-specific payment obligation, global credit limit, and the global payment obligation of the customer requesting the credit, wherein the determining if the credit request can be accepted is based on whether the total of the global payment obligation and a credit amount of the credit request exceeds the global credit limit and whether the total of the shop-specific payment obligation and the credit amount of the credit request exceeds the shop-specific credit limit; and
   sending a response to the one of the plurality of online shops indicating an acceptance or a declination of the credit request.

2. The credit authorization system of claim 1, wherein the credit request is accepted if the global payment obligation of the customer plus the credit amount of the credit request does not surpass the global credit limit.

3. The credit authorization system of claim 1, wherein the receiving comprises receiving a payment notification being indicative of a payment received by one of the plurality of online shops from the customer and for reducing the global payment obligation of that customer by the payment amount in response to receipt of the payment notification.

4. The credit authorization system of claim 3, wherein the receiving comprises reducing the shop-specific payment obligation of that customer to the online shop from which the payment notification is received by the payment amount.

5. The credit authorization system of claim 1, wherein the method further comprises storing a payment history for the customer, the rules for updating the global credit limit and the shop-specific credit limit using the customer's corresponding payment history.

6. The credit authorization system of claim 1, wherein the plurality of online shops and the credit authorization system are coupled by a computer network.

7. A credit authorization system for authorizing a credit request of a customer, the credit authorization system comprising:
 a processor; and
 a memory storing instructions that cause the processor to perform a method comprising:
  storing a global credit limit for the customer, wherein the global credit limit of the customer specifies a maximum amount of cumulative credit which can be provided by a plurality of online shops to the customer;
  storing a global payment obligation for the customer, wherein the global payment obligation for the customer is defined as a cumulative credit exposure the customer has with respect to the plurality of online shops;
  storing shop-specific credit limits for the plurality of online shops;
  storing rules for updating the global credit limit and the shop-specific credit limits for the plurality of online shops;
  receiving the credit request from one of the plurality of online shops;
  determining if the credit request can be accepted in view of the shop-specific credit limit, shop-specific payment obligation, global credit limit, and the global payment obligation of the customer requesting the credit, wherein the determining if the credit request can be accepted is based on whether the total of the global payment obligation and a credit amount of the credit request exceeds the global credit limit and whether the total of the shop-specific payment obligation and the credit amount of the credit request exceeds the shop-specific credit limit; and
  sending a response to the one of the plurality of online shops indicating an acceptance or a declination of the credit request.

8. The credit authorization system of claim 7, wherein the determining comprises accepting the credit request if the global payment obligation of the customer making the credit request plus the credit amount of the credit request does not surpass the global credit limit of that customer.

9. The credit authorization system of claim 8,
 wherein the method further comprises storing a shop-specific payment obligations for the plurality of online shops; and
 whereby the determining further comprises accepting the credit request if the shop-specific payment obligations of the customer making the credit request to the online shop from which the credit request is received plus the credit amount of that credit request does not surpass the shop-specific credit limit of that customer.

10. The credit authorization system of claim 7, wherein the receiving comprises receiving a payment notification being indicative of a payment received by at least one of the plurality of online shops from the customer and for reducing the global payment obligation of that customer by the payment amount in response to receipt of the payment notification.

11. The credit authorization system of claim 7, wherein the receiving comprises reducing the shop-specific payment obligation of the customer to an online shop from which the payment notification is received by the payment amount.

12. The credit authorization system of claim 7, wherein the method further comprises storing a payment history for the customer, the rules for updating the global credit limit and the shop-specific credit limit using the customer's corresponding payment history.

13. A computer program product tangibly embodied in a computer-readable medium for authorizing a credit request of a customer, the computer program product comprising instructions for performing the steps of:
 storing a global credit limit of the customer for a plurality of online shops, wherein the global credit limit of the customer specifies a maximum amount of cumulative credit that can be provided by the plurality of online shops to the customer;
 storing a global payment obligation of the customer for the plurality of online shops, wherein the global payment obligation for the customer is defined as a cumulative credit exposure that the customer has with respect to the plurality of online shops;
 storing shop-specific credit limits for the plurality of online shops;
 storing rules for updating the global credit limit and the shop-specific credit limits for the plurality of online shops;
 receiving of a credit request from at least one of the plurality of online shops;
 determining if the credit request can be accepted in view of the shop-specific credit limit, shop-specific payment obligation, global credit limit, and the global payment obligation of the customer making the credit request, wherein the determining if the credit request can be accepted is based on whether the total of the global payment obligation and a credit amount of the credit request exceeds the global credit limit and whether the total of the shop-specific payment obligation and the credit amount of the credit request exceeds the shop-specific credit limit; and
 generating a response for the one of a plurality of online shops indicating an acceptance or a declination of the credit request.

14. The computer program product of claim 13, wherein the instructions are adapted to accept the credit request if the global payment obligation of the customer plus the credit amount of the credit request does not surpass the global credit limit.

15. The computer program product of claim 14, wherein the instructions are adapted to accept the credit request if a shop-specific payment obligation of the customer making the request to the one of a plurality of online shops from which the credit request is received, plus the credit amount of the credit request does not surpass a shop-specific credit limit.

16. The computer program product of claim 13, wherein the instructions are adapted to receive a payment notification being indicative of a payment received by one of the online shops from the customer and for reducing the global payment obligation of that customer by the payment amount in response to receipt of the payment notification.

17. The computer program product of claim 13, wherein the rules for updating the global credit limit and the shop-specific credit limit use the customer's customer payment history and/or a customer credit rating.

18. A computer-implemented method for authorizing credit requests of a customer, the method comprising:
 storing a global credit limit of the customer for the plurality of online shops, wherein the global credit limit of the customer specifies a maximum amount of cumulative credit that can be provided by the plurality of online shops to the customer;
 storing a global payment obligation of the customer for the plurality of online shops, wherein the global payment obligation for the customer is defined as a cumulative credit exposure that the customer has with respect to the plurality of online shops;

storing shop-specific credit limits for the plurality of online shops;

storing rules for updating the global credit limit and the shop-specific credit limits for the plurality of online shops;

receiving a credit request, using a processor, for the customer from at least one of the plurality of online shops, the credit request indicating a requested credit amount by the customer; and determining, by processor, if the credit request can be accepted in view of the shop-specific credit limit, shop-specific payment obligation, global credit limit, and the global payment obligation of the customer requesting the credit, wherein the determining if the credit request can be accepted is based on whether the total of the global payment obligation and the credit amount of the credit request exceeds the global credit limit and whether the total of the shop-specific payment obligation and the credit amount of the credit request exceeds the shop-specific credit limit; and generating an output indicating whether the credit request is accepted.

19. The computer-implemented method of claim 18, further comprising:

determining a shop-specific payment obligation of the customer to the one of the plurality of online shops; and accepting of the credit request, if the shop specific payment obligation plus the credit amount does not surpass the shop-specific credit limit.

20. The computer-implemented method of claim 18, further comprising the steps of:

receiving a payment notification from at least one of the plurality of online shops, the payment notification being indicative of a payment received by the one of the plurality of online shops from the customer; and reducing the global payment obligation and the shop-specific payment obligation of the customer by the payment amount.

21. The computer-implemented method of claim 18, wherein the rules for updating of the global credit limit and the shop-specific credit limit of the customer use of the customer's payment history data and/or customer credit rating data.

22. The credit authorization system of claim 1, wherein the global payment obligation for the customer is defined as a cumulative credit exposure said customer has with respect to the at least one of a plurality of online shops.

* * * * *